May 28, 1968  J. H. RIESENBERG  3,385,328

CONSTANT LEVEL FILLING MACHINE

Filed Nov. 12, 1965  9 Sheets-Sheet 2

INVENTOR.
James H. Riesenberg
BY Christel + Bean
ATTORNEYS.

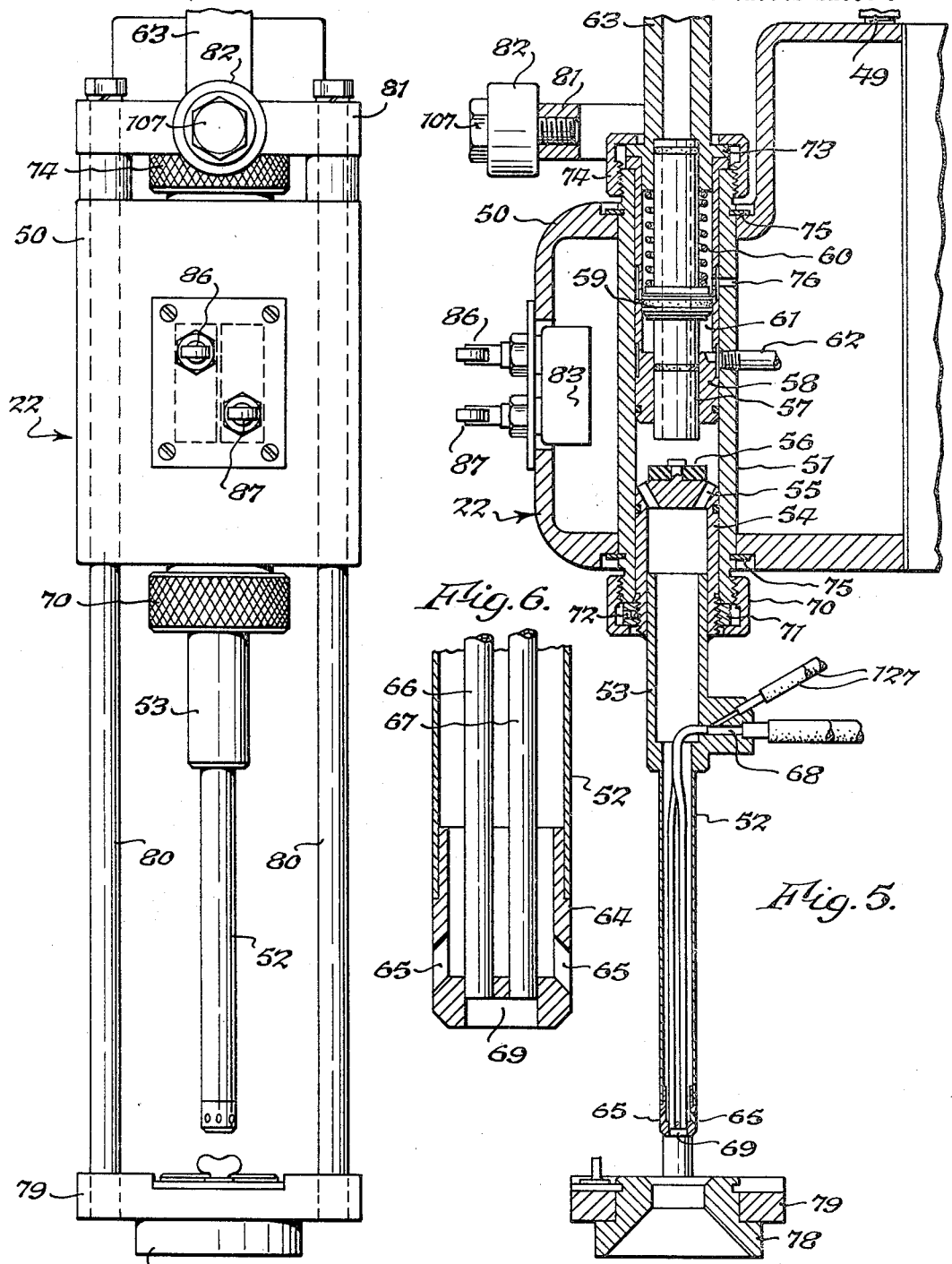

May 28, 1968  J. H. RIESENBERG  3,385,328
CONSTANT LEVEL FILLING MACHINE
Filed Nov. 12, 1965  9 Sheets-Sheet 4
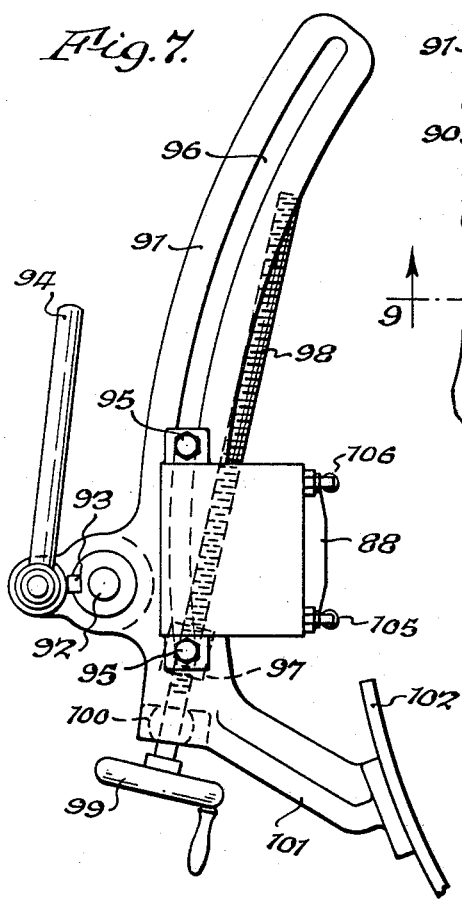
Fig. 7.
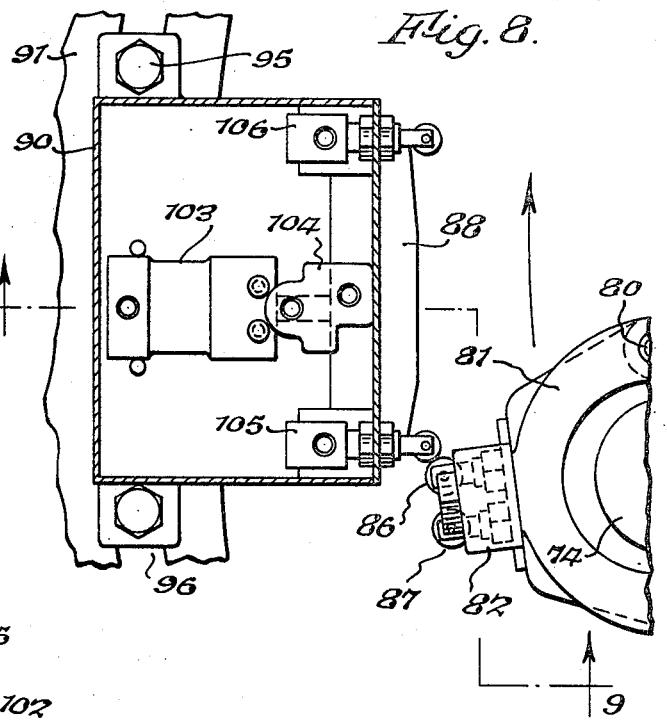
Fig. 8.
Fig. 9.
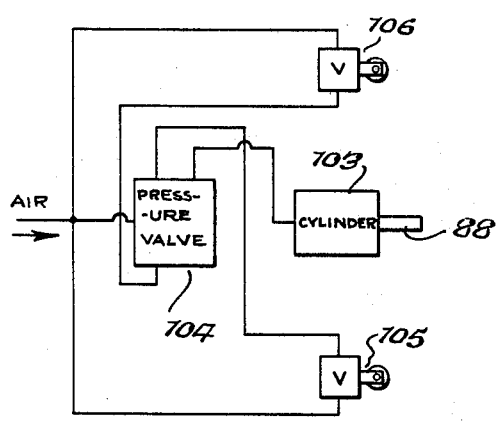
Fig. 10.
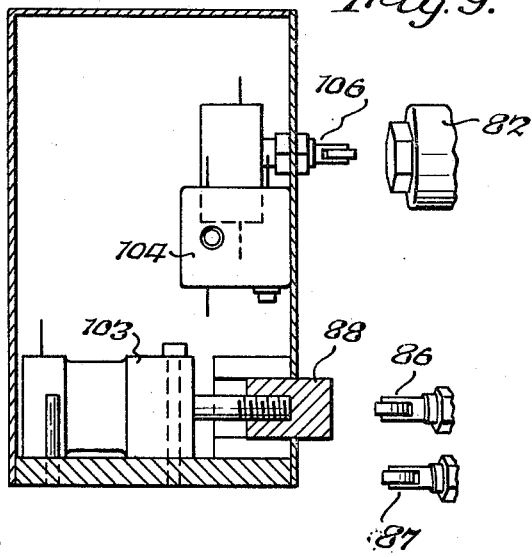
INVENTOR.
James H. Riesenberg
BY Christel + Bean
ATTORNEYS.

May 28, 1968 J. H. RIESENBERG 3,385,328
CONSTANT LEVEL FILLING MACHINE
Filed Nov. 12, 1965 9 Sheets-Sheet 5
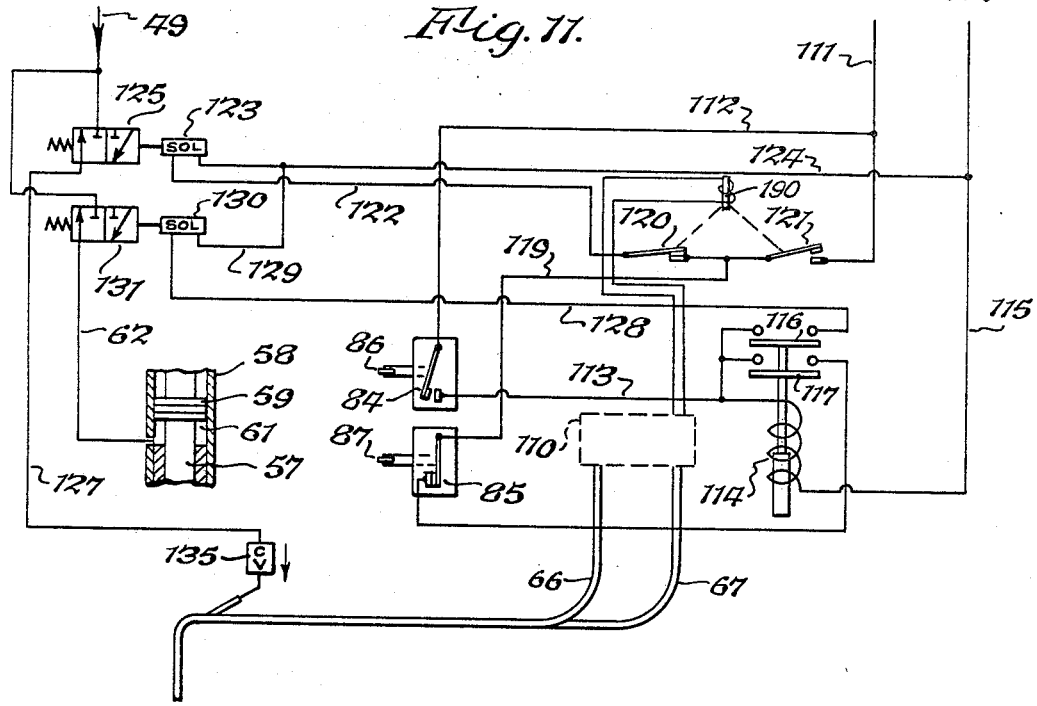
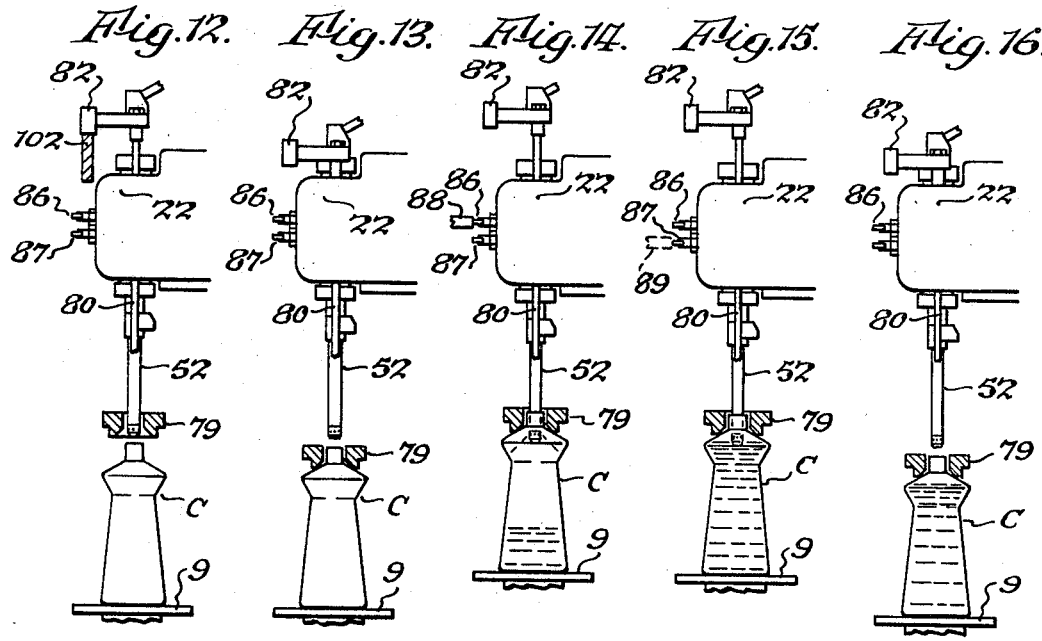
INVENTOR.
James H. Riesenberg
BY Christel & Bean
ATTORNEYS.

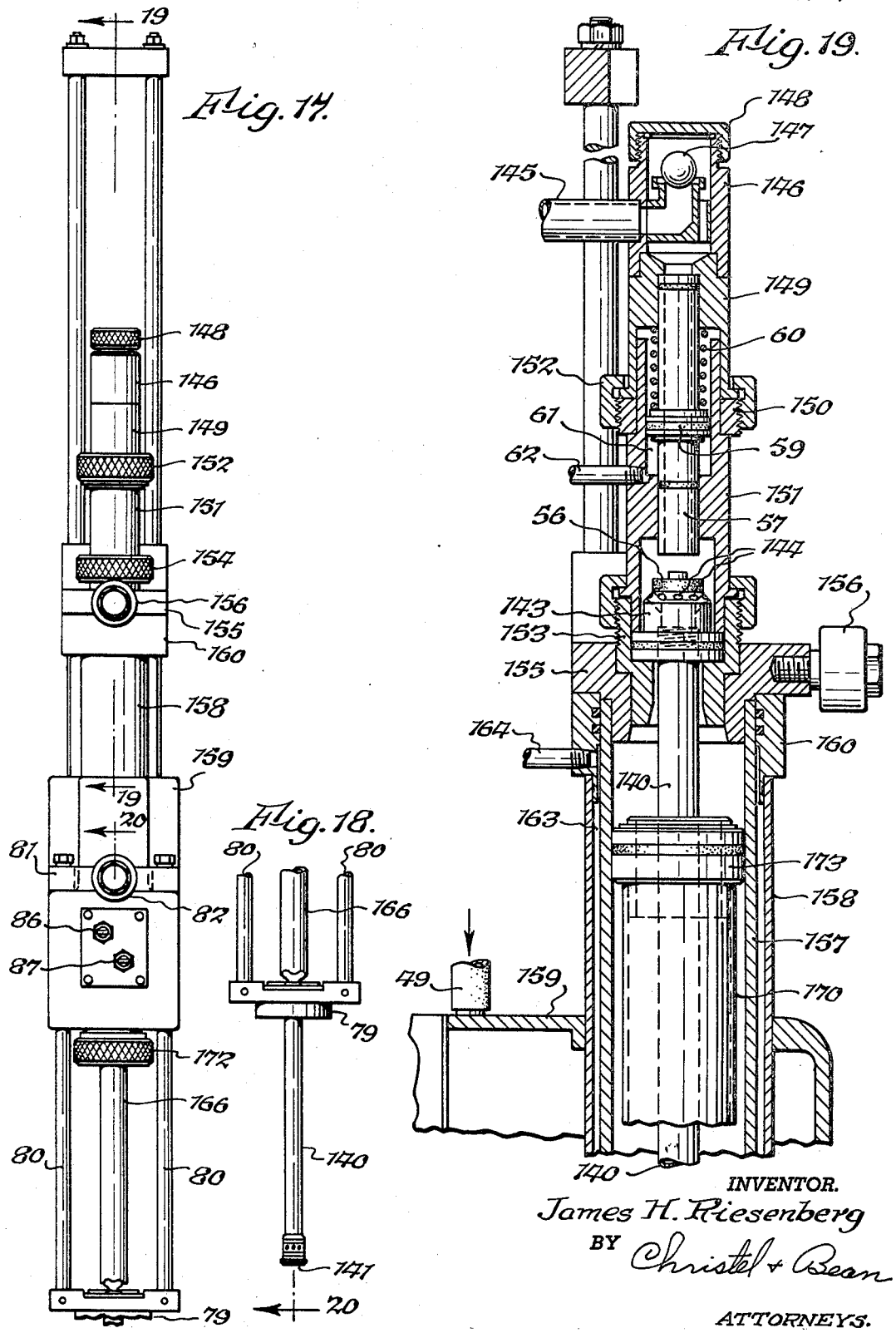

May 28, 1968  J. H. RIESENBERG  3,385,328
CONSTANT LEVEL FILLING MACHINE
Filed Nov. 12, 1965  9 Sheets-Sheet 7
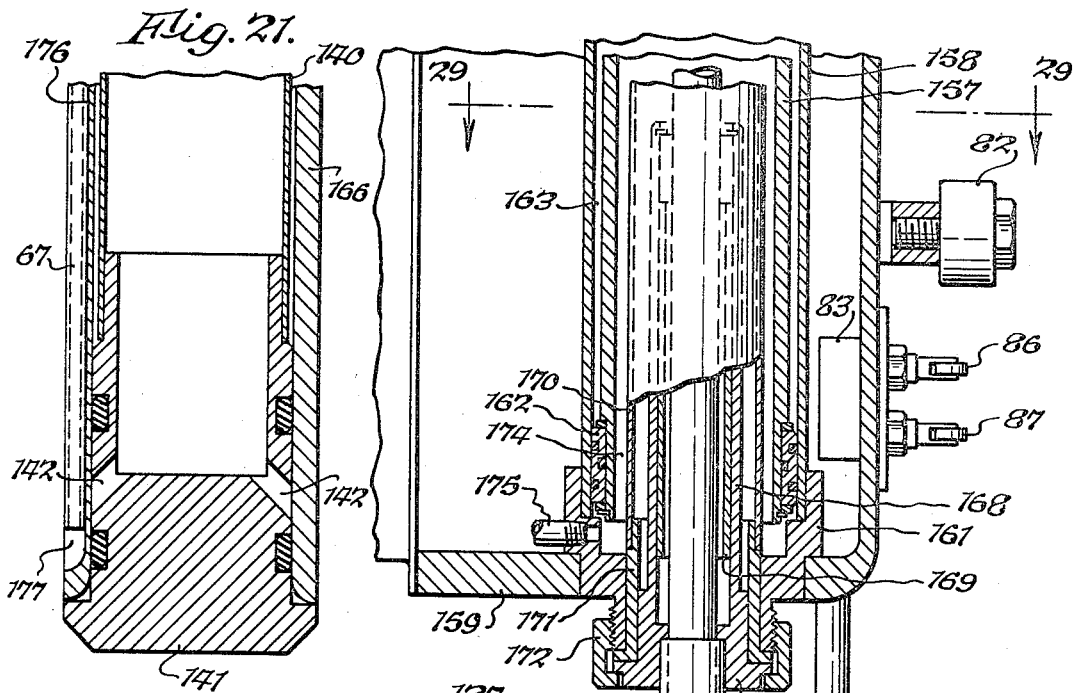
Fig. 21.
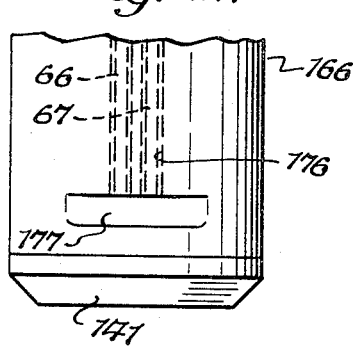
Fig. 22.
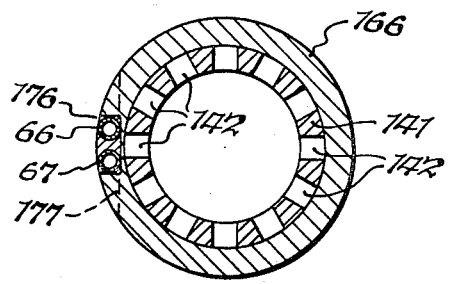
Fig. 23.
Fig. 20.
INVENTOR.
James H. Riesenberg
BY Christel & Bean
ATTORNEYS.

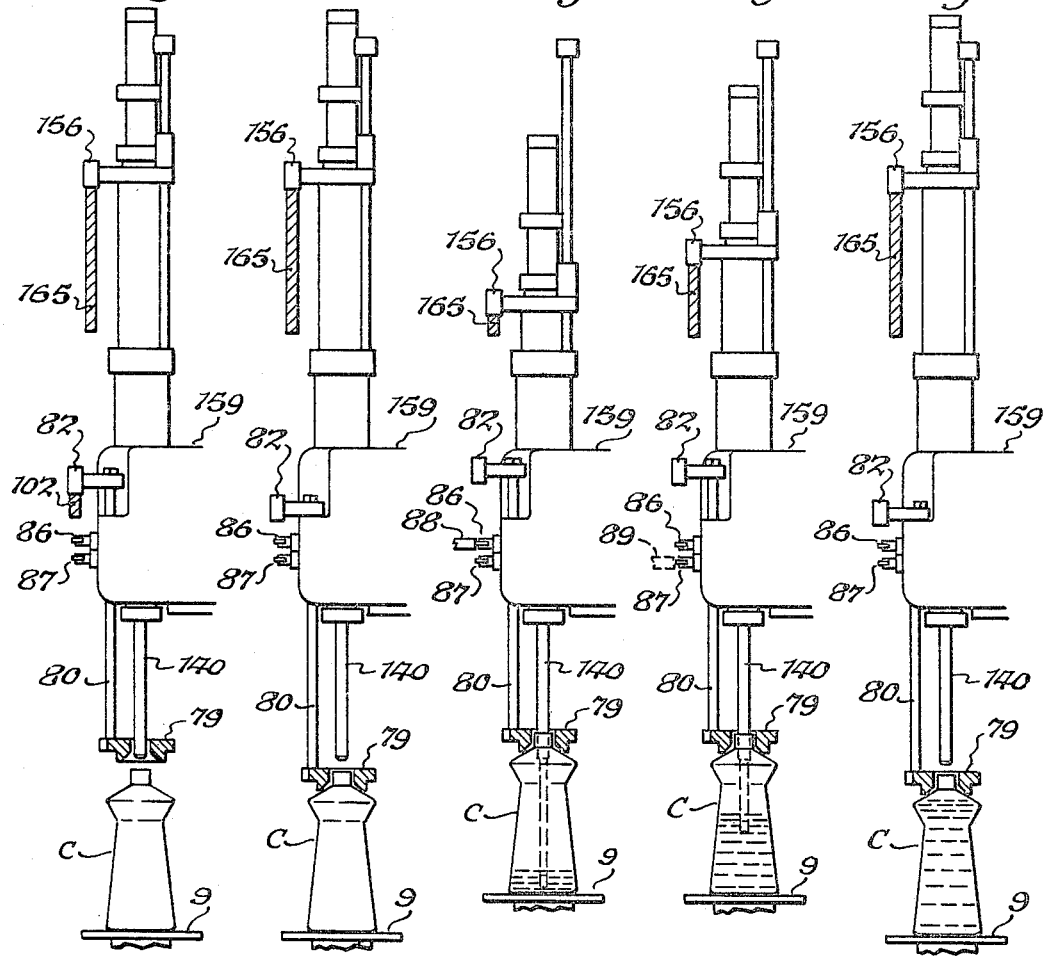
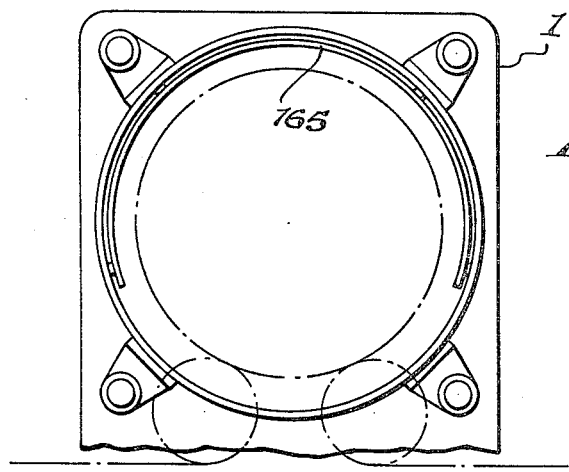

United States Patent Office 3,385,328
Patented May 28, 1968

3,385,328
CONSTANT LEVEL FILLING MACHINE
James H. Riesenberg, Amherst, N.Y., assignor to
Consolidated Packaging Machinery Corporation,
Buffalo, N.Y.
Filed Nov. 12, 1965, Ser. No. 507,288
12 Claims. (Cl. 141—96)

ABSTRACT OF THE DISCLOSURE

A container to be filled is supported in filling position relative to a filling head having a product dispensing passage. Product level sensing means associated with the head include sonic means responsive to the rising level of product in the container. Flow control means responsive to the sensing means interrupt the dispensing of product. Further features are a submergible filling head and an arrangement preventing the dispensing of product in the absence of a container to be filled.

---

This invention relates generally to the filling art, and more particularly to a new and useful product level sensing arrangement for filling machines.

In constant level filling, it is desired to maintain a predetermined fill height as successive containers are filled with product. Various means have been devised for accomplishing this, utilizing for example either vacuum or positive pressure to sense when the container has been filled to the desired height. However, such sensing systems are affected by variations in viscosity of the product, and by variations in temperature which affect product viscosity. Also, the product sometimes tends to plate the vacuum sensing tube, which is undesirable. In addition, foaming, even though relatively light, often interferes with proper operation of such sensing systems.

A primary object of this invention is to provide a product level sensing arrangement for filling machines which is substantially unaffected by variations in temperature and viscosity, and need not be adjusted to accommodate such variations.

Another object of this invention is to accomplish the foregoing relatively inexpensively, and with a high degree of accuracy and dependability.

Still another object of this invention is to provide a filling machine product level sensing control arrangement which does not require adjustment to accommodate variations in viscosity and temperature, which is not affected by light foaming, and which incorporates means automatically operable to clear the sensing lines of product.

Briefly stated, the level sensing control arrangement of my invention is characterized in one aspect thereof by the provision of sonic sensing means operable automatically in response to arrival of the product at a predetermined height in a container to discontinue filling of the container.

The foregoing and other objects, advantages and characterizing features of my invention will become clearly apparent from the ensuing detailed description of two presently contemplated embodiments thereof, reference being made to the accompanying drawings depicting the same wherein like reference numerals denote like parts throughout the various views and wherein:

FIG. 4 is a fragmentary side elevational view, on an enlarged scale, showing one of the filling head assemblies;

FIG. 5 is a fragmentary vertical sectional view thereof;

FIG. 6 is a fragmentary longitudinal sectional view, on a further enlarged scale, of the discharge end of the filling nozzle of FIGS. 4 and 5;

FIG. 7 is a fragmentary plan view of a switch actuating mechanism and its mounting;

FIG. 8 is a fragmentary plan view, on an enlarged scale, showing the switch actuating mechanism, uncovered, and a filling head approaching the same;

FIG. 9 is a view thereof, partly in section and partly in perspective, taken about on line 9—9 of FIG. 8 and showing the relation between the switch actuating mechanism and the filling head in the absence of a container to be filled;

FIG. 10 is a diagrammatic view of the switch actuating mechanism;

FIG. 11 is a diagrammatic layout of the sonic sensing and electrical control circuit;

FIGS. 12-16 are generally schematic views showing successive relative positions of a container and filling head assembly;

FIG. 17 is a fragmentary front elevational view showing the upper portion of a submergible filling head incorporating the sonic sensing of my invention;

FIG. 18 is a fragmentary front elevational view in continuation of FIG. 17, showing the lower portion of the sonic sensing submergible filling head;

FIG. 19 is a fragmentary vertical sectional view thereof, on an enlarged scale, taken about on line 19—19 of FIG. 17;

FIG. 20 is a fragmentary vertical sectional view taken about on line 20—20 of FIGS. 17 and 18;

FIG. 21 is an enlarged, fragmentary, vertical sectional view showing the dispensing nozzle of FIG. 20 retracted into the sensing tube housing;

FIG. 22 is a fragmentary elevational view taken about on line 22—22 of FIG. 20;

FIG. 23 is a horizontal sectional view taken about on line 23—23 of FIG. 20;

FIGS. 24-28 are generally schematic views showing successive relative positions of the filling head assembly and a container;

FIG. 29 is a greatly simplified plan view of a filling machine, illustrating the layout of the actuating cam for the submergible filling head.

Figure 1:
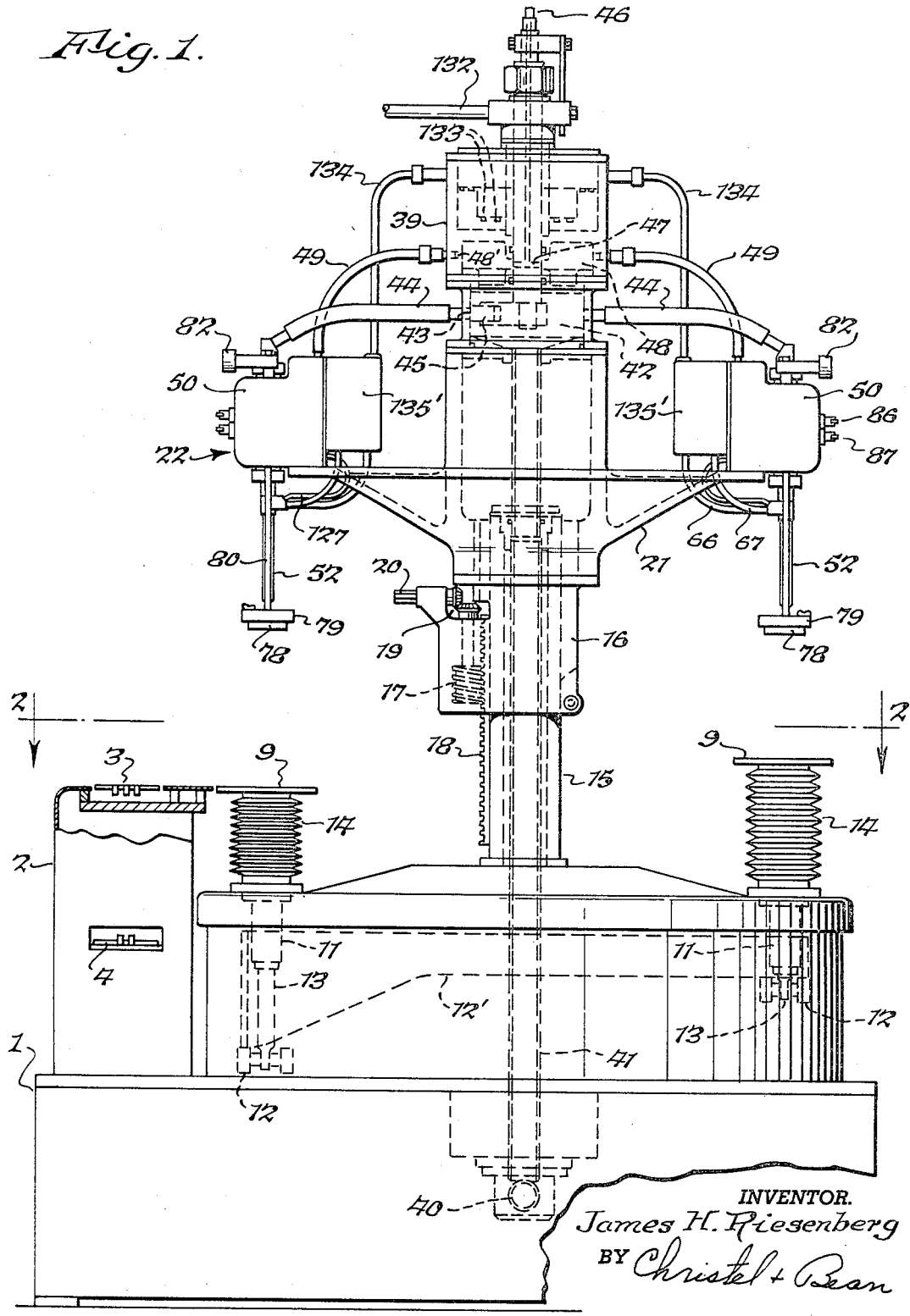
FIG. 1 is a view partly in section but primarily in side elevation showing a filling machine incorporating the level control of my invention, being taken about on line 1—1 of FIG. 2 with some parts omitted for greater clarity and with other parts being broken away for ease of illustration.

Referring now in detail to the illustrative embodiment depicted in FIGS. 1-16 of the accompanying drawings, there is shown a filling machine incorporating the level sensing and control mechanism of my invention. The machine has a base 1 and a conveyor section 2 which includes a conveying mechanism having a conveying flight 3 and a return flight 4. Empty containers are fed to the machine on conveying flight 3 under control of an infeed worm 5, being held in position thereagainst by a guide 6 which can be laterally adjusted. Worm 5 delivers containers in properly spaced sequence to an infeed star wheel 7 which carries them around a guide cam 8 and onto the container supporting trays or platforms 9.

In the illustrated machine there are a total of eighteen trays 9, although either a larger or a smaller number could be provided. Trays 9 are mounted on a rotatable housing cover plate 10, and are vertically reciprocable relative thereto under control of any suitable means such as, for example pneumatic cylinders 11 urging rollers 12 against a guide cam 12' which regulates the raising and lowering of trays 9 in a manner understood in the art. The trays 9 can be mounted on the upper end of piston rods 13, which are enclosed by flexible boots 14 from the trays 9 to cover plate 10.

Trays 9 are annularly arranged about a rotating central column 15 to which plate 10 is secured for rotation therewith. A head 21 is mounted on column 15 for rotation therewith, having a sleeve 16 arranged in vertical telescoping relation to column 15. A worm 17 carried by sleeve 16 engages a rack 18 on column 15, worm 17 having a beveled gear connection 19 to a shaft 20 formed to receive a wrench or other tool, to be rotated for raising and lowering the head 21 relative to the table 10.

Individual filling head assemblies 22 are provided, equal in number to the number of container supporting trays 9, being generally vertically alined therewith. The containers fed onto trays 9 are filled by the filling head assemblies 22 as they are carried around the central column 15, and then are discharged by an outfeed star wheel 23 in conjunction with guide cam 8 onto the conveying flight 3.

Central column 15 is rotated by a drive mechanism including a motor 24 having a drive belt connection 25 to a shaft 26 which in turn has a drive belt connection 27 to the input shaft 28 of a speed reducer 29. A gear 30 on the output shaft 31 of speed reducer 29 engages a gear 32 connected to column 15, and a drive chain 33 provides a connection between sprockets on shafts 31 and 34 which latter has chain and sprocket connections 35 to the drive shafts 36 of the infeed and outfeed star wheels 7 and 23, respectively. A chain and sprocket drive connection 37 is provided from the infeed star wheel drive shaft 36 to a power shaft 38 for worm 5. In this way column 15, star wheels 7 and 23 and worm 5 are driven by motor 24 in properly synchronized relation.

The product with which the containers are to be filled is brought in through base 1 via product supply lines 40 and 41 passing through column 15 and head 21 to a product chamber 42 in a housing 39 on head 21. The product is supplied to the individual filling head assemblies via lateral openings 43 in the side wall of chamber 42 and individual conduits 44, under control of a segmental, stationary restricting valve 45 operable to reduce product pressure at the end of the filling cycle, as will be described. Air under positive pressure is brought in through a conduit 46 along the center line of column 15, from above, communicating through lateral passages 47 with an air chamber 48 having constant communication with the individual filling head assemblies through openings 48' in the side wall of chamber 48 and conduits 49.

The various filling head assemblies 22 are identical in construction and operation, whereby only one thereof will be described in detail. In the embodiment of FIGS. 1–16, each filling head assembly comprises a housing 50 mounted on an annular, horizontal shelf on head 21 by any suitable means. A vertical tube 51 extends through housing 50 at the upper and lower ends of the tube. A tubular filling stem 52 extends downwardly from a sleeve 53 which is secured in a valve seat sleeve 54 in the lower end of tube 51. Sleeve 54 has several inlet openings 55 extending obliquely through the upper end wall thereof, the openings 55 being annularly arranged around a valve seat 56. A tubular valve 57 is vertically reciprocable in a sleeve 58 in the upper end of tube 51, under control of a piston 59 on valve 57 adapted to be shifted upwardly against a spring 60 under the influence of positive air pressure supplied to chamber 61 between piston 59 and the lower end of sleeve 58. Air is supplied to chamber 61 via conduit 62 which is connected, by valve means to be described, with the air inlet conduit 49. Valve 57 is shown in FIG. 5 in its raised position, for dispensing product from a supply line 63 communicating with the product line 44 and furnishing product through tubular valve 57 and openings 55 to filling stem 52. The lower end of filling stem 52 has a hollow tip 64 closed at its lower end and formed with several product dispensing passages 65 opening obliquely downwardly therearound through the tip side wall.

Filling stem 52 also carries a pair of sonic sensing tubes 66, 67 which communicate at their upper ends with lateral passages 68 through sleeve 53, and at their lower ends open into a sonic coupling cavity 69 formed in the bottom wall of tip 64, the tubes 66, 67 being brazed or otherwise secured in place.

The filling stem 52 and sleeve 54 are removable as a unit from tube 51 through the lower end thereof, being releasably held in place by means of a cap nut 70 threading on the outer, lower end of tube 51 against a nut 71 threaded onto sleeve 54 and having set screw engagement therewith as shown at 72, whereby the position of nut 71 on sleeve 54 can be varied to adjust the position of filling stem 52.

Similarly, the sleeve 58 slip fits into the upper end of tube 51, having a flanged upper end engaging the upper end of tube 51. Conduit 63 has a flange 73 spaced inwardly from its lower end which is engaged by a cap nut 74 threaded on the outer, upper end of tube 51 whereby sleeve 58 and conduit 63 are releasably secured in position. Tube 51 is releasably held in housing 50 by snap rings 75, and the chamber above piston 59, in which spring 60 is mounted, is adapted to be vented through a side wall vent 76.

A centering bell 78 is carried by a yoke 79 for engaging containers adjacent the neck thereof to center the same relative to filling stem 52, in a manner known in the art. Yoke 79 is carried by a pair of rods 80 which are mounted in housing 50 for vertical reciprocation relative thereto, the upper ends of the rods 80 carrying a cross bar 81 for movement therewith, the cross bar 81 having a roller type cam follower 82 bolted thereon as shown at 107.

Figure 2:
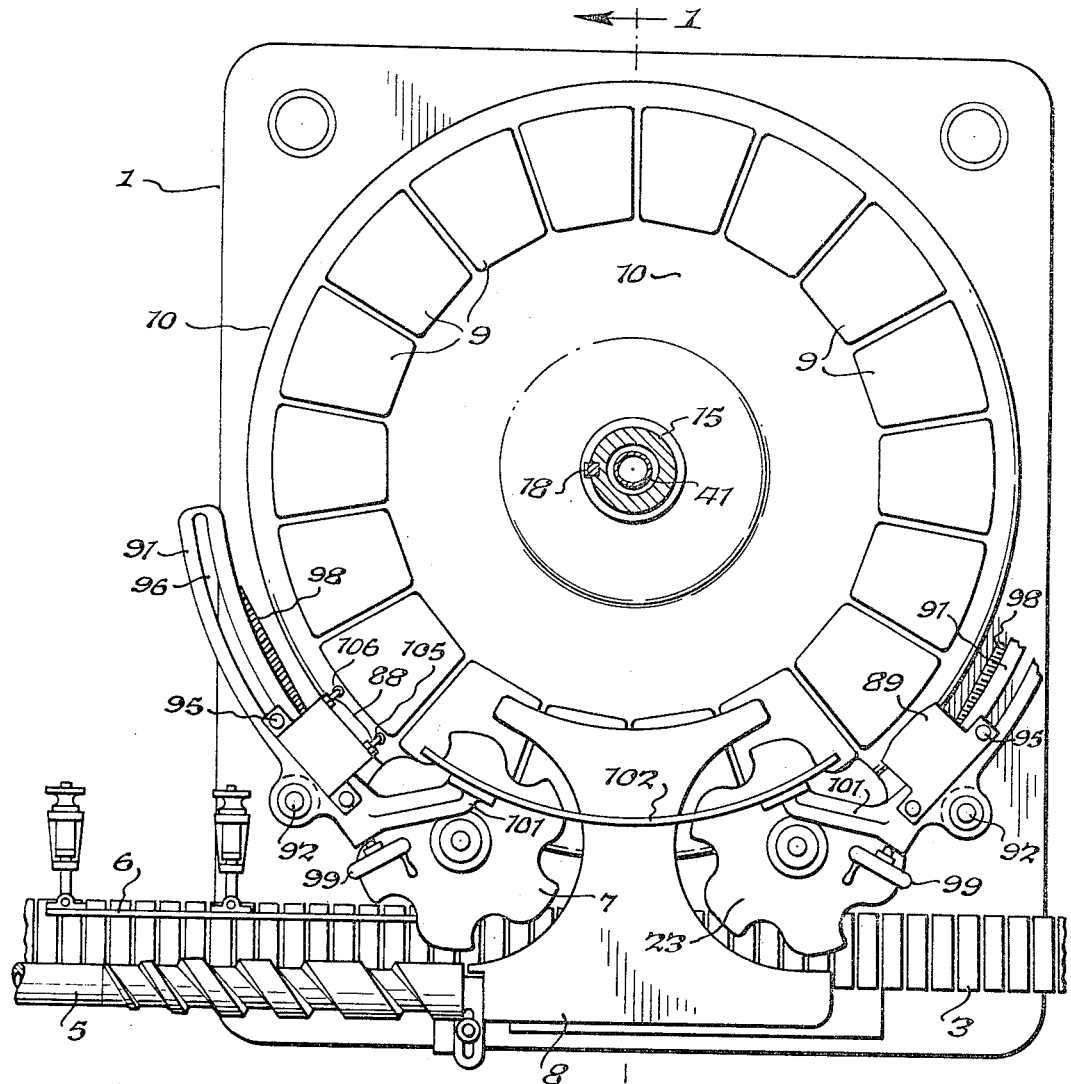
FIG. 2 is a view thereof partly in plan and partly in horizontal section, being taken generally about on line 2—2 of FIG. 1.
Figure 3:
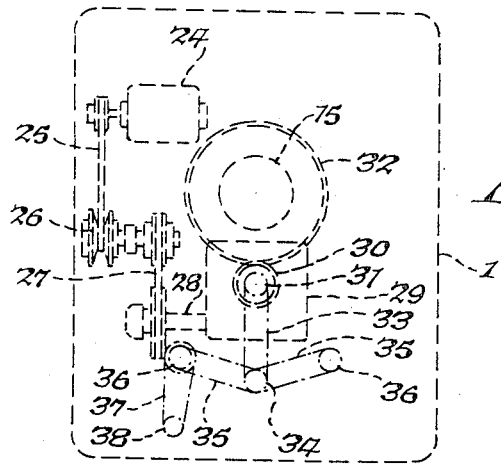
FIG. 3 is a generally diagrammatic view of the drive mechanism thereof.
Figure 30:
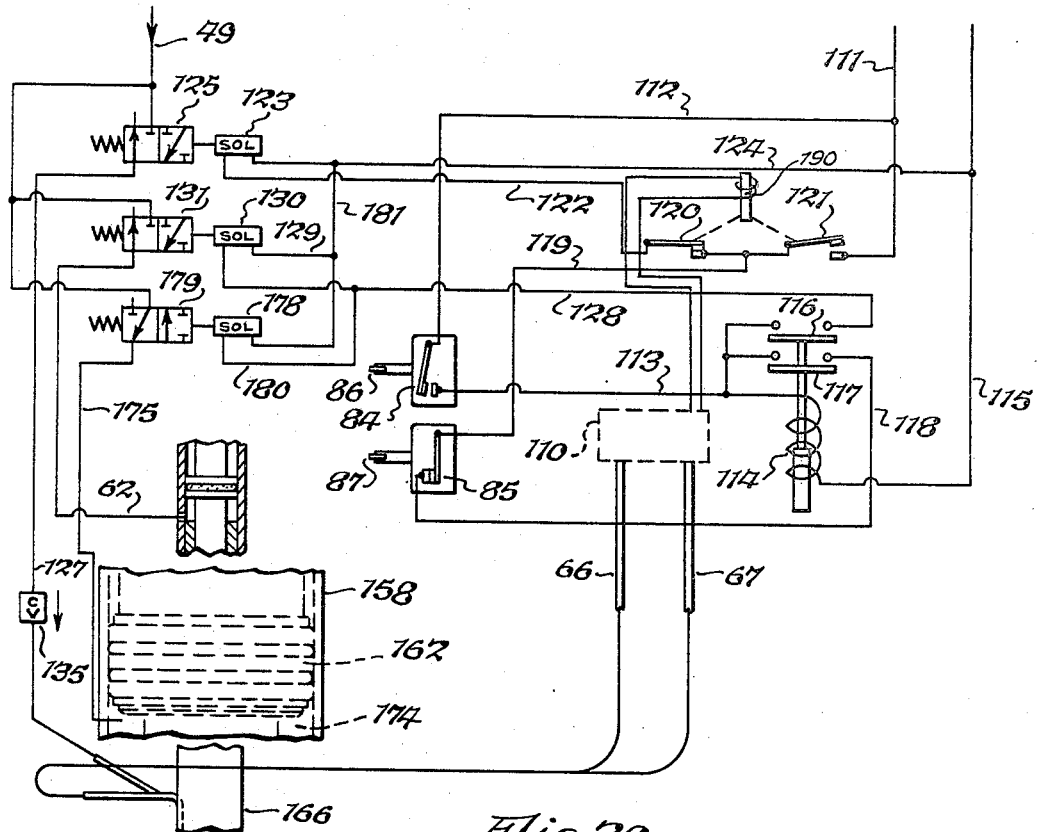
FIG. 30 is a generally diagrammatic layout of the sonic sensing and electrical control circuit.

Each housing 50 mounts a micro switch assembly 83 containing a pair of switches 84, 85 having outwardly projecting, roller type actuating members 86, 87, respectively. The actuating member 86 is adapted to be engaged and actuated by a retractable cam 88, when the same is in its extended position, and actuating member 87 is engaged and actuated by a fixed cam 89 (FIG. 2). The retractable cam 88 is mounted on a housing 90 carried by an arcuate arm 91 mounted on a vertical supporting column 92 extending upwardly from the base 1 of the frame. Arm 91 has a ratchet engagement with column 92, as indicated at 93, adapted to be actuated by a wrench 94 for raising and lowering the position of arm 91 on column 92 thereby to position cam 88 in the same horizontal plane as actuating member 86, this being shown in FIG. 7 but omitted from FIG. 2 for clarity, the arms 91 and actuating cams 88, 89 being shown in FIG. 2 to indicate the plan view location thereof.

Housing 90 is mounted on arm 91 by bolts 95, extending through an arcuate slot 96 on arm 91, and one of which carries a swivel nut 97 having threaded engagement with a rod 98 adapted to be rotated by a hand wheel 99. Rotation of rod 98 causes housing 90 to be moved along the arm 91, thereby to vary the location of cam 88 in a horizontal plane. Housing 90 and fixed cam 89 are releasably secured in position along their respective arms 91 by friction engagement with rod 98. Rod 98 is mounted on arm 91 by a universal type joint 100, to accommodate such tracking of housing 90 along slot 96.

Fixed cam 89 has a similar mounting arrangement, and each of arms 91 includes a lateral arm 101 supporting a cam 102 arranged to engage the followers 82 of the various filling heads, as will be described.

Cam 88 is extended and retracted by a motor comprising a pneumatic cylinder 103 actuated by a valve 104 controlling the admission of air to cylinder 103, the arrangement being such that upon admission of air to the cylinder 103 the cam 88 is retracted out of the path of actuators 86. Upon relieving air pressure, the cylinder is spring returned to again extend cam 88 into the path of actuators 86. Valve 104 is controlled by a pair of pneumatic switches 105, 106 arranged to be sequentially actuated by the head of bolt 107 securing cam follower 82 on cross bar 81 if the yoke is lowered. This occurs when there is no container present on the associated tray 9 as will be described, and serves to preclude filling through that filling head under that circumstance.

Referring now to the circuit diagram of FIG. 11, sonic sensing tubes 66 and 67 are connected to a transducer in the form of an ultrasonic, variable frequency generator-receiver 110 of a type known in the art, such a transducer being available for example from Delavan Manufacturing Company of West Des Moines, Iowa under the name "Sonac" whereby a detailed disclosure thereof is believed unnecessary. For further details, reference may be had to United States Patent 3,065,455. Transducer 110 generates an ultrasonic signal of relatively low power having a frequency of 38,000 c.p.s. The signal thus generated is transmitted via one of tubes 66, 67 to cavity 69 where it is coupled to the receiver of transducer 110 via the other tube, the arrangement being such that as long as the tubes are ultrasonically coupled at the cavity, filling continues. Transducer 110 is energized under control of the master switch, not shown, for the machine drive. When the coupling is interrupted, as by the presence of liquid product in the cavity, the signal is cut off and this is utilized in a manner to be described to stop the filling operation.

Assuming that a container is present to be filled, upon rotation of the trays about column 15 the actuating member 86 of start switch 84 is engaged by cam 88 to close switch 84. This completes an energizing circuit from a suitable source via leads 111 and 112, switch 84 and lead 113 to the coil of a relay 114 having a return connection via lead 115 to the source. When energized, relay 114 closes switches 116 and 117, the latter completing a holding circuit via lead 118, normally closed stop switch 85, lead 119 and either one of switches 120, 121 which are controlled by the sonic signal generator and receiver 110. Assuming that some product from the previous filling operation has adhered to the wall of cavity 69, blocking sonic coupling, switch 120 will be closed thereby completing the aforesaid holding circuit via lead 122, solenoid 123 and lead 124. Solenoid 123, when energized, moves a valve 125 to admit air from conduit 49 through valve 125 and air lines 127 to each of the sensing tubes 66, 67, to clear them of product. A separate clearing blast air line 127 is provided for each sensing tube. Simultaneously, closing switch 116 completes an energizing circuit via leads 128 and 129 to a solenoid 130 which then shifts a valve 131 for admitting positive pressure air from conduit 49 via conduit 62 to chamber 61 below piston 59. This lifts product control valve 57 and product begins to flow through the filling stem and its outlets 65 into the container, shown at C in FIGS. 12–16. The filling operation progresses as the sensing ducts are cleared. Once the sensing ducts 66, 67 are cleared, sonic coupling is established, producing a signal utilized to close the normally open switch 121 to maintain the holding circuit, and then open the normally closed switch 120. This interrupts the energizing circuit to solenoid 123 controlling air valve 125, which latter is then spring returned to its closed, blocking position, discontinuing the admission of high pressure air to the sensing ducts. This occurs at the beginning of the filling operation, well in advance of the rise of product to the desired level in the container C.

When the product level in container C reaches cavity 69, sonic coupling is interrupted, discontinuing the aforesaid coupling signal. As a result, switch 121 is opened, interrupting the holding circuit for relay 114, opening switches 116 and 117 and interrupting the energizing circuit to solenoid 130, whereby valve 131 is spring returned to closed position, discontinuing the supply of high pressure air to chamber 61. Spring 60 then urges the valve 57 to closed position. Switch 120 is closed after switch 121 opens, it being understood that switches 120 and 121 can be actuated by a relay 190 energized by or under control of the sonic coupling signal, with switch 121 closing and opening prior to opening and closing, respectively, of switch 120.

Should the sonic sensing cutoff fail to work for any reason, or should the container drop away prior to sensing, switch actuator 87 will be engaged by cam 89 to open switch 85 and thereby break the aforesaid holding circuit, prior to arrival of the container at the discharge end of the machine.

Referring now to FIGS. 12–16, the cam 102 holds the centering bell 79 elevated as a container C is fed onto the associated tray 9, as shown in FIG. 12. As the machine rotates follower 82 drops from cam 102, causing the centering bell 79 to move down and engage the neck of the container, as shown in FIG. 13. Then, tray 9 is lifted under control of cam 12 (FIG. 1), raising the container to the position of FIG. 14 with filling stem 52 inserted into the container, and raising centering bell 79, follower 82 and nut 107 above the level of switches 105, 106. As a result, cam 88 moves actuator 86 causing filling to begin. When the container is filled to the level of cavity 69, the operation is discontinued by sonic sensing, or subsequentially by cam 89, as indicated in FIG. 15. Then, tray 9 is lowered, under control of cam 12, to the position shown in FIG. 16. Follower 82 then engages cam 102 and lifts centering bell 79 away from the container, so that the latter can be discharged via outfeed star wheel 23, this being the position shown in FIG. 12.

While a blast of high pressure air is disclosed for the purpose of clearing the sonic sensing, constant low pressure air could be utilized for this purpose. A one way check valve 135 is positioned in one of the clearing air lines 127, to preclude sonic coupling through these lines while permitting clearing air to pass therethrough to ducts 66 and 67.

Clearing blast valve 125 and air valve 131 are three-way valves which, when closed, vent the sensing ducts 66, 67 and cavity 69, and the chamber 61, to atmosphere. Otherwise, a pocket of air would be trapped in cavity 69 by the rising liquid, requiring a greater hydraulic pressure to interrupt the sonic coupling, just as air trapped in chamber 61 would interfere with closing of valve 57. Instead of three-way valves, constant venting through relatively restricted openings could be used.

Valve 45 is arranged to slow down the pressure of product flowing through the filling head near the end of the filling cycle, just prior to arrival at the desired fill height, to accommodate the time required for the sonic sensing to operate and thereby avoid overfilling. While the time required for response of the sonic sensing is measured in milliseconds, it will be appreciated that by reducing product flow just prior to the end of filling, any overfill can be substantially avoided.

The electric wiring is brought in by cable as indicated at 132 (FIG. 1) through the upper end of the machine along a non-rotating part of head 21, being delivered to the individual filling head assemblies by a slip ring connection indicated at 133 and cables 134, all in a manner which will be readily understood by those skilled in the art. The various control components shown in FIG. 11, other than switches 84 and 85, can be housed in a sensor control box generally indicated at 135', mounted on housing 50.

In some situations a submergible filling tube is desired. For example, when it is desired to avoid agitation and foaming, it is known to provide a filling stem which initially is moved to a position adjacent the bottom of a container and then raised as the filling operation progresses. The sonic sensing system of my invention can be incorporated in such a submergible construction, as shown in FIGS. 17–30.

In this arrangement, there is provided a filling stem having a tip 141 with obliquely downwardly directed discharge openings 142 therethrough, adjacent its lower end. Adjacent its upper end, stem 140 terminates in a head 143 having obliquely upwardly directed inlet passages 144 corresponding to passages 55 in the embodiment of FIGS. 1–16. As before, a valve sleeve 57 is urged by spring 60 against piston 59 to seat on a washer seat 56 and thereby interrupt flow from a product line indicated at 145. The product line 145 opens upwardly into a sleeve 146, and carries an anti-siphoning ball check valve 147 which is loosely confined in the upper end of sleeve 146 by a cap 148 threaded thereon, the valve 147 serving to prevent reverse flow of product which otherwise might occur upon machine shutdown. Sleeve 146 is carried by a body 149 in which the upper end of valve 57 is reciprocable, the body 149 being held against a nut 150 on the upper end of a body 151 by a nut 152. The high pressure line 62 communicates with the chamber 61 in body 151 below piston 59 for urging the valve 57 upwardly against the action of return spring 60. Body 151 is flanged in spaced relation to its lower end, for being held against a threaded sleeve 153 by a nut 154, the sleeve 153 being secured in a collar 155 to which is secured a roller cam follower 156.

Collar 155 is secured to the upper end of a tubular member 157 which extends through a tubular casing 158 coaxial therewith. Casing 158 extends through the upper wall of a housing 159, and is provided at its upper end with a head 160 having O-ring seals bearing against the tube 157. At its lower end, casing 158 seats in a shouldered end member 161 which extends through the bottom wall of housing 159. The lower end of tube 157 carries a piston assembly including O-rings sealed thereagainst and against the casing 158, as shown at 162. In this way, there is provided an annular air chamber 163 between tube 157 and casing 158, and between piston 162 and head 160. Constant low pressure air is admitted to chamber 163 via conduit 164, whereby piston 162 and tube 157 are urged down, to the position shown in FIGS. 19 and 20, by the air cushion end chamber 163. Tube 157 and with it the filling stem 140 are raised, against the bias of the air cushion in chamber 163, by cam 165 (FIG. 29) and follower 156.

Stem 140 is vertically reciprocable in a sleeve 166 carried by the shouldered lower end 167 of a sleeve 168 which can contain a reinforcing sleeve 169.

A tube 170 extends upwardly within tube 157, being mounted at its lower end in a collar 171 which, like the end 167 has a lateral flange for engagement against the threaded end member 161, the members 167 and 171 being held in position by a nut 172. At its upper end, tube 170 carries a head 173 in sealing engagement with tube 157, the tubes 157, 158 and 170 defining a chamber 174 closed at its ends by pistons 162, 173 and member 161. High pressure air can be introduced into chamber 174 through a conduit 175 to act on piston head 162 against the low pressure in chamber 163 to raise filling stem 140.

In this instance, the sonic sensing tubes 66, 67 extend along a longitudinal recess 176 in the side wall of sleeve 166, being brazed therein and opening into a coupling cavity 177 which faces radially outwardly. The operation of this embodiment is the same as described with reference to FIGS. 12–16. Cam 102 holds centering bell 79 elevated as the container C is moved onto tray 9, as shown in FIG. 24. Then cam 102 falls away, permitting follower 82 and bell 79 to drop with the latter engaging the container C as shown in FIG. 25. Cam 165 maintains the filling stem 140 elevated during this time, as shown in FIGS. 24 and 25. Then cam 165 drops away, and filling stem 140 is lowered by the positive action of the low air pressure in chamber 163 and cam 88 closes switch 84 to start filling, as shown in FIG. 26. A clearing air blast is provided, and the sonic sensing operation containers, as before. As the filling progresses, stem 140 is raised by the action of cam 165 on follower 156 against the air pressure in chamber 163, as shown in FIG. 27. The filling operation is discontinued when the liquid level reaches coupling cavity 177 and interrupts the sonic coupling, as previously described. Then, tray 9 is lowered and the filled container is discharged. Follower 156 leaves cam 165, but stem 140 is held fully retracted in elevated position, as shown in FIG. 21, by high pressure air in cavity 174. This occurs when a solenoid 178 is deenergized, causing spring returned valve 179 to open and admit air to chamber 174. Solenoid 178, like solenoids 123 and 130, is deenergized when the sonic coupling signal is discontinued and the holding circuit interrupted. The flow of high pressure air to chamber 173 is interrupted upon energizing solenoids 123, 130 and 178, the latter via leads 180 and 181, at the beginning of the filling operation, whereby the filling stem then is lowered under the influence of low pressure air in chamber 163, as permitted by cam 165. When solenoid 178 is energized, valve 179 vents chamber 174 to atmosphere.

The provision of the low air pressure hold down is effective in causing follower 156 to follow cam 165 and lower the filling stem, overcoming any tendency of tip 141 to stick in tube 166 due to product viscosity which gravity alone might not be sufficient to do.

Accordingly, it is seen that my invention fully accomplishes its intended objects. Through sonic sensing, a fast acting, accurate and dependable level control, unaffected by variations in temperature and viscosity, and by light foam, is provided. By clearing the sensing tubes during the beginning of the filling cycle, no filling time is lost and any drip is into the container C. While I have disclosed and described in detail only two embodiments, that has been done by way of illustration only, without thought of limitation.

Having fully disclosed and completely described my invention, and its mode of operation, what I claim as new is:

1. In a container filling machine, a filling head having a product dispensing passage, means for supporting a container to be filled in a filling position relative to said filling head, product level sensing means associated with said filling head including sonic means responsive to the rising level of product in a supported container, and product flow control means responsive to said sensing means for interrupting the dispensing of product from said filling head.

2. A container filling machine as set forth in claim 1, together with means for supplying product to said dispensing passage initially at a relatively high rate of flow and thereafter at a reduced flow rate.

3. A container filling machine as set forth in claim 1, together with means for moving said filling head and said container supporting means through a predetermined path, and supplemental means operable independently of said sonic sensing means to interrupt the dispensing of product upon arrival of said filling head at a predetermined point along said path.

4. A container filling machine as set forth in claim 1, wherein said sensing means includes sensing tube means extending through said filling head, and sonic generating means associated with said tube means for establishing a sonic circuit therethrough, said product flow control means being responsive to interruption of said sonic circuit.

5. A container filling machine as set forth in claim 4, together with means for supplying air to said tube means to clear the same of product.

6. A container filling machine as set forth in claim 5, together with means operable substantially simultaneously with said air supplying means for supplying product to said dispensing passage, and means responsive to clearing of said sensing tube means for discontinuing the supplying of air thereto.

7. A container filling machine as set forth in claim 1, wherein said sensing means includes means on said filling head providing a sonic coupling cavity at the level to which a supported container is to be filled, a pair of sensing tubes extending through said filling head to said cavity, and sonic generating and receiving means associated with said tubes for establishing a sonic circuit through said tubes and said cavity, said product flow control means being responsive to interruption of said sonic circuit.

8. A container filling machine as set forth in claim 7, together with means for supplying air under positive pressure to said tubes to clear the same of product, and check valve means in said air supplying means to preclude establishing a sonic circuit through the latter.

9. A container filling machine as set forth in claim 7, wherein said filling head includes a filling stem containing said dispensing passage, said acoustical coupling cavity being positioned on said stem adjacent the lower end thereof, and said sensing tubes extending through said stem to said cavity.

10. A container filling machine as set forth in claim 7, wherein said filling head includes a sleeve and a filling stem through said sleeve and movable relative thereto, said filling stem containing said dispensing passage, and said sleeve containing said cavity.

11. In a container filling machine, a machine frame, a filling head mounted for movement relative to said frame and having a product dispensing passage, means for supporting a container to be filled in a filling position relative to said filling head, container engaging means carried by said filling head for movement between a first position when a container is present on said supporting means and a second position in the absence of a supported container, means for supplying product to said dispensing passage including a control valve means for regulating the flow of product through said dispensing passage, means for actuating said control valve means including switch means carried by said filling head, a retractable actuating cam carried by said frame for movement into and out of the path of said switch means, means for retracting said actuating cam, and means connected to said container engaging means for actuating said cam retracting means when said container engaging means is in said second position.

12. In a container filling machine, a filling head including a cylinder, means mounting said filling head for movement through a predetermined path, a filling stem extending through said cylinder, a piston connected to said stem for movement therewith in said cylinder, a cam extending along said path of movement, a follower connected to said stem for movement therewith, means for admitting fluid under pressure to said cylinder on one side of said piston for causing said follower to follow said cam, and means for admitting fluid to said cylinder on the opposite side of said piston under pressure sufficient to overcome the fluid pressure on said one side of said piston.

References Cited

UNITED STATES PATENTS

| 2,676,742 | 4/1954 | Day et al. | 141—141 |
| 3,195,587 | 7/1965 | Mattimoe et al. | 141—392 X |
| 3,265,099 | 8/1966 | Severino et al. | 141—95 |

FOREIGN PATENTS

| 515,003 | 7/1955 | Canada. |

LAVERNE D. GEIGER, *Primary Examiner.*

H. S. BELL, *Assistant Examiner.*